Patented Sept. 4, 1945

2,384,104

UNITED STATES PATENT OFFICE 2,384,104

TRIACYL PENTOSES AND PROCESS FOR THE MANUFACTURE THEREOF

John Lee, Essex Fells, and Leo Berger, Nutley, N. J., assignors to Hoffmann-La Roche, Inc., Nutley, N. J., a corporation of New Jersey No Drawing. Application September 30, 1943, Serial No. 504,444

9 Claims. (Cl. 260—234)

Our invention relates to a new and improved method for the manufacture of 2,3,4-triacyl and 2,3,5-triacyl pentoses, and to the products obtainable thereby.

We have discovered that hitherto unknown 2,3,4- and 2,3,5-triacyl pentoses can be obtained from triacylated N-pentosides by hydrolysis.

In our copending application, Ser. No. 504,442, filed of even date herewith, we have described and claimed a new class of α-aromatic amine N-pentosides to which we have assigned the probable formula of pyranosides:

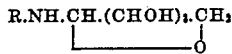

wherein R is a cyclic residue such as benzene or naphthalene which may be substituted by a further group or groups which are non-reactive with pentoses under the conditions of the reaction, such as alkyl, alkoxy, hydroxy, nitro, halogen, carboxyl, carbalkoxy groups, such as, for example, phenyl, naphthyl, tolyl, xylyl, methoxyphenyl, hydroxyphenyl, nitrophenyl, chlorophenyl, carboxyphenyl, carbethoxyphenyl.

These new pyranosides are characterized by ease of formation when a primary aromatic amine and a sugar are condensed in solution at room temperature at a pH range of from about 2 to about 8, and especially by the fact that they crystallize directly in good yield and are easily separated from the solution advantageously in the form of complexes with soluble alkali metal or ammonium salts. We have pointed out in the copending application that this strong tendency to separate from solution is apparent even where the solutions of the sugar are relatively impure.

The new N-pyranosides can be acylated to form triacyl derivatives which correspond to the probable general formula:

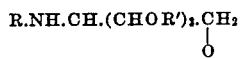

wherein R has the signification given to it in the above general formula for our new N-pentosides, and wherein R' is an acyl residue, such as formyl, acetyl, propionyl, butyryl or benzoyl. By blocking off the 2-, 3-, and 4-positions of our N-pentosides in this fashion, our invention provides an approach to the substitution of the 5-position on pentoses, and thus forms a valuable tool for the furtherance of the scientific study of pentoses.

Kuhn and Birkofer in Ber. 71, 629 (1938) have described another class of N-pentosides which are formed in solution by condensation of a primary aromatic amine and a pentose with application of heat. We have stated in our copending application that in order to demonstrate the fact that the two N-pentosides represent different classes, we compared the compound formed by heating together ribose and 3,4-dimethylaniline in alcoholic solution, as described by Kuhn and Birkofer, with the compound resulting from the condensation of the components at room temperature according to our process. The former compound has the probable formula of a furanoside:

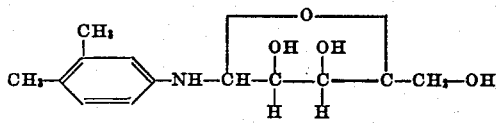

and the characteristics: $[\alpha]_D^{21} = +172°$ ($c = 0.5$ in pyridine), M. P. 128–130°, whereas the probable formula of our compound is that of a pyranoside:

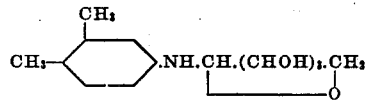

with the characteristics: $[\alpha]_D^{25°} = +94.5° \rightarrow +53.0°$ ($c = 1.0$ in pyridine), M. P. 110–120° C.

We have discovered that it is possible to obtain 2,3,4- and 2,3,5-triacyl pentoses from both classes of triacylated N-pentosides by hydrolysis. Such hydrolysis can be effected by refluxing the triacylated N-pentoside in aqueous or aqueous alcoholic solution or suspension until the hydrolysis is complete, as can be determined if necessary by polarimetric observation. The preferred pH range for the hydrolysis is from about 2 to about 10, and the decomposition of the triacylated N-pentoside may be facilitated by binding the liberated amine to an aldehyde present during the reaction, such as benzaldehyde, substituted aromatic benzaldehyde, formaldehyde and the like. We may also advantageously add a small quantity of a volatile lower fatty acid, such as formic, acetic or propionic acid, or traces of strong acids, although the latter cause some decomposition of the pentoses, particularly of ribose. The presence of a non-oxidizing atmosphere is advantageous. This can be accomplished by displacing the air with $CO_2$ or $N_2$.

The following examples illustrate our invention:

Example 1

10.0 g. α-2,3,4-triacetylaniline-N-d-ribopyranoside is dissolved in 25 cc. ethyl alcohol and added to 400 cc. of a 0.5% acetic acid solution. The solution is steam distilled until all the aniline is removed. The aqueous solution is treated with carbon, filtered, and concentrated to dryness under vacuo. The resultant syrup is dried via repeated alcohol distillations. Yield 5.0 g. 2,3,4-triacetyl ribose.

Calc. $C_{11}H_{16}O_8 \cdot \tfrac{1}{2}H_2O$, C=46.32, H=5.97; found C=46.52, H=6.09.

$$[\alpha]_D^{30} = -26.3°, 1\% H_2O$$

*Example 2*

6.0 g. α-aniline-N-d-ribofuranoside (prepared by heating α-aniline-N-d-ribopyranoside in alcohol) is dissolved in 50 cc. dry pyridine, cooled to 0° C. and 18 cc. of acetic anhydride added slowly with stirring. Upon completion of the addition, the reaction is kept at room temperature for a day. One hour's heating at 40-50° completes the reaction.

The reaction mixture is poured into 250 cc. of cold water and the syrupy mass that separates out is picked up in ether. The ether solution is washed to neutrality, dried overnight over anhydrous sodium sulfate. The solvent is then removed. The resultant product is a hard, yellowish glass at room temperature, which flows at 60°. This yields 8.3 g. (88.9%) of 2,3,5-triacetyl-N-d-ribofuranoside.

3 g. of 2,3,5-triacetyl-N-d-ribofuranoside is suspended in 200 cc. of water and 1 cc. glacial acetic acid. The mixture is steam distilled to remove the aniline, the syrupy triacetylfuranoside going into solution in a few minutes. After all the aniline is removed the flask liquor is filtered after treatment with a small amount of norite and a clear aqueous solution evaporated to dryness and dried by taking up in alcohol and removing the solvent several times. 2,3,5-triacetylribofuranose is a syrup.

What we claim is:

1. Process for the manufacture of 2,3,4-triacetyl ribose which comprises dissolving α-2,3,4-triacetylaniline-N-d-ribopyranoside in ethyl alcohol, adding the solution to water containing enough acetic acid to adjust the pH of the solution to a range of from 2 to about 8, steam distilling the aqueous solution to remove the aniline and concentrating the remaining solution to dryness under vacuo.

2. Process for the manufacture of 2,3,5-triacetyl ribose which comprises suspending 2,3,5-triacetyl-N-d-ribofuranoside in water to which enough acetic acid has been added to adjust the pH of the solution to a range of from about 2 to about 8, steam distilling to remove the aniline, purifying the remaining liquor and evaporating the clear aqueous solution to dryness.

3. The triacylriboses, where the acyl residue is a member selected from the group of lower fatty acids and carboxylic acids of the benzene series.

4. 2,3,4-triacetylribose.

5. 2,3,5-triacetylribose.

6. 2,3,5-tribenzoylribose.

7. A process for the manufacture of a triacyl pentose which comprises heating a primary amine N-triacyl pentoside, in which the acyl radical is selected from the group consisting of lower fatty acids and carboxylic acids of the benzene series, in solution within a pH range of from about 2 to about 8 in the presence of water until hydrolysis is substantially complete, separating the amine set free and isolating the pentose from the aqueous solution by evaporation.

8. 2,3,4-triacyl riboses wherein the acyl residue is a member selected from the group consisting of lower fatty acids and carboxylic acids of the benzene series.

9. 2,3,5-triacyl riboses wherein the acyl residue is a member selected from the group consisting of lower fatty acids and carboxylic acids of the benzene series.

JOHN LEE.
LEO BERGER.